United States Patent [19]
Yamaura

[11] Patent Number: 6,062,843
[45] Date of Patent: May 16, 2000

[54] MOTOR CONTROL APPARATUS FOR AN INJECTION MOLDING MACHINE

[75] Inventor: Hiroshi Yamaura, Nagano, Japan

[73] Assignee: Nissei Plastic Industrial Co., Ltd., Nagano-Ken, Japan

[21] Appl. No.: 09/065,570

[22] Filed: Apr. 24, 1998

[30] Foreign Application Priority Data

Apr. 24, 1997 [JP] Japan .................................... 9-107751

[51] Int. Cl.⁷ .................................................. B29C 45/80
[52] U.S. Cl. ........................................... 425/136; 425/151
[58] Field of Search ..................................... 425/136, 151

[56] References Cited

U.S. PATENT DOCUMENTS

| | | | |
|---|---|---|---|
| 3,628,901 | 12/1971 | Paulson | 425/136 |
| 4,710,119 | 12/1987 | Otake | 425/136 |

FOREIGN PATENT DOCUMENTS 60-112417  6/1985  Japan .

*Primary Examiner*—Tim Heitbrink
*Attorney, Agent, or Firm*—Birch, Stewart, Kolasch & Birch, LLP

[57] ABSTRACT

A motor control apparatus for an injection molding machine has a control function section for stopping a drive motor; i.e., a servomotor in order to stop a movable member, upon reception of an open signal indicating that a safety door is opened. The motor control apparatus further includes an additional control function section for performing position control for the servomotor, upon reception of the open signal, so as to stop the movable member at a predetermined position. Therefore, when the safety door is opened and thus the open signal is supplied to the additional control function section, the additional control function section performs position control for the servomotor such that the movable member stops at the predetermined position.

7 Claims, 4 Drawing Sheets

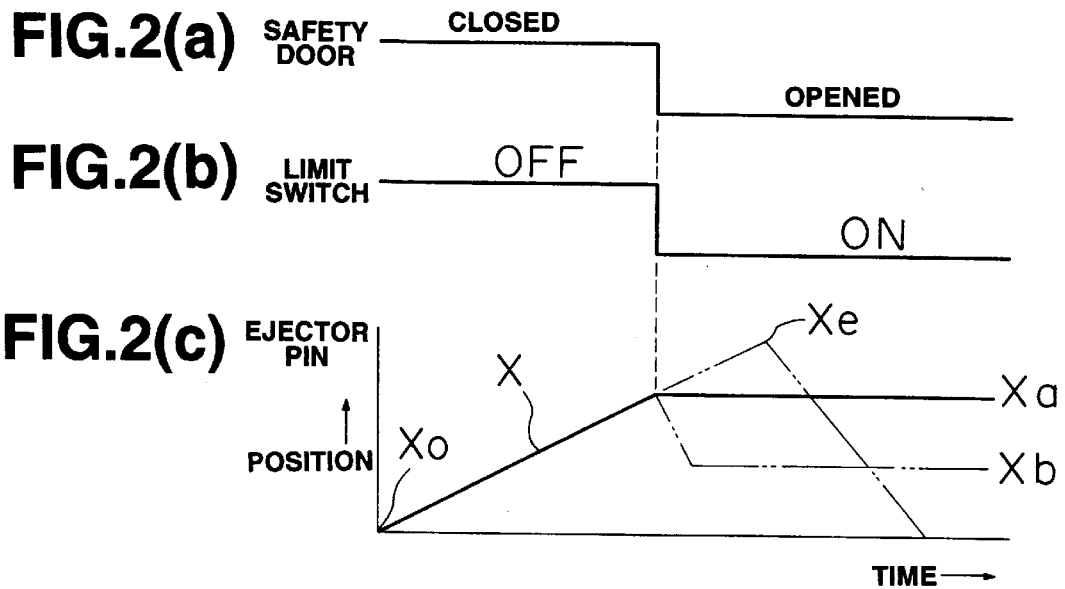
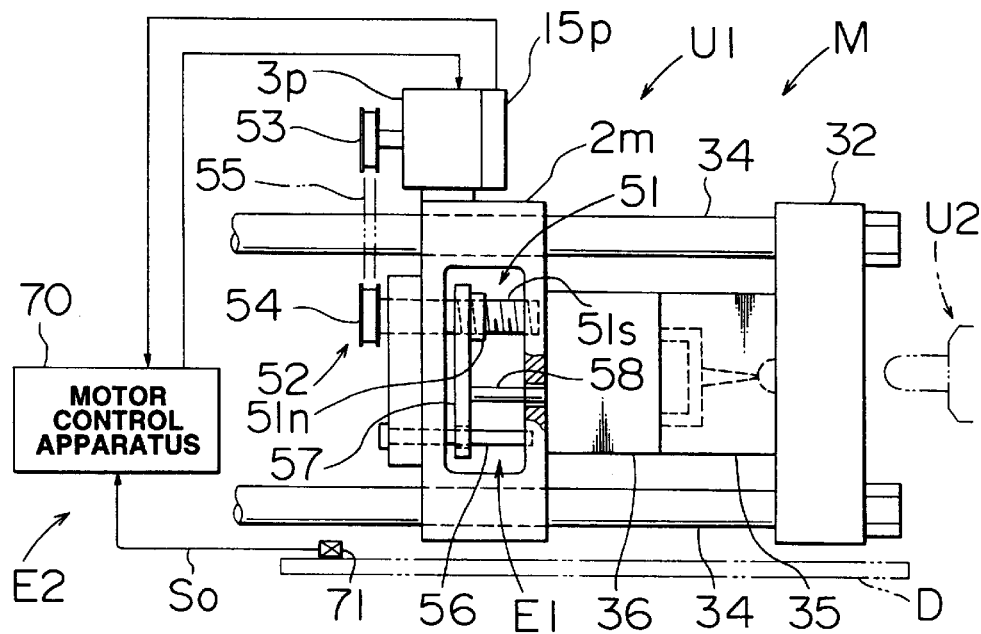
FIG.3 PRIOR ART

MOTOR CONTROL APPARATUS FOR AN INJECTION MOLDING MACHINE

BACKGROUND OF THE INVENTION

1. Fields of the Invention

The present invention relates to a motor control apparatus for an injection molding machine, which includes a control function section for stopping a drive motor for moving a movable member upon reception of a signal indicating that a safety door is opened.

2. Description of the Related Art

Conventionally, there has been known a mold clamping apparatus provided in an injection molding machine, in which a movable platen is moved by means of a servomotor (drive motor), as disclosed in, for example, Japanese Patent Application Laid-Open (kokai) No. 60 (1985)-112417.

FIGS. 3 and 4 show a typical mold clamping apparatus U1 utilizing a servomotor. A motor-driven injection molding machine M is composed of the mold clamping apparatus U1 and an injection apparatus U2, only the tip end portion of which is illustrated by an imaginary line.

The mold clamping apparatus U1 includes a stationary platen 32 fixed onto a machine base 31, and a drive platen 33 fixed onto the machine base 31 at a position apart from the stationary platen 32. Four tie bars 34 are disposed between the stationary platen 32 and the drive platen 33, and a movable platen 2m is slidably supported by the tie bars 34. A stationary mold 35 is attached to the stationary platen 32, while a movable mold 36 is attached to the movable platen 2m. The stationary mold 35 and the movable mold 36 constitute a molding mold.

A servo motor 3c is attached to a side surface of the drive platen 33, and a screw shaft 37s constituting a ball-screw mechanism 37 is rotatably disposed at the center of the drive platen 33. The servomotor 3c and the screw shaft 37s are connected together via a rotation transmission mechanism 38. In this case, the rotational transmission mechanism 38 is composed of a pulley 39 attached to the shaft of the servomotor 3c, a pulley 40 attached to the screw shaft 37s, and an endless belt 41 disposed between the pulleys 39 and 40 to loop around them. A nut member 37n in screw engagement with the screw shaft 37s, the movable platen 2m, and the drive platen 33 are coupled together via a toggle mechanism 42. The servomotor 3c is equipped with a rotary encoder 15c for detecting the rotational position of the servomotor 3c.

By virtue of the above-described structure, when the servomotor 3c is operated, rotation of the servomotor 3c is transmitted to the screw shaft 37s of the ball-screw mechanism 37 via the rotation transmission mechanism 38, and thus the nut member 37n advances and retracts in the axial direction of the screw shaft 37s. The advancing/retracting movement of the screw shaft 37s is transmitted to the movable platen 2m via the toggle mechanism 42, so that the movable platen 2m advances and retracts with respect to the stationary platen 32 in order to open and close the mold.

Further, the mold clamping apparatus U1 is equipped with a molding product ejection apparatus E1. As shown in FIG. 3, in the molding product ejection apparatus E1, a servomotor 3p is attached to a side surface of the movable platen 2m, and a screw shaft 51s constituting a ball-screw mechanism 51 is rotatably disposed within the movable platen 2m. The servomotor 3p and the screw shaft 51s are connected together via a rotation transmission mechanism 52. In this case, the rotational transmission mechanism 52 is composed of a pulley 53 attached to the shaft of the servomotor 3p, a pulley 54 attached to the screw shaft 51s, and an endless belt 55 disposed between the pulleys 53 and 54 to loop around them. Further, a guide rail 56 is attached to the movable platen 2m in parallel to the screw shaft 51s. One lateral end of a pin support plate 57 is slidably supported by the guide rail 56, and the other lateral end of the pin support plate 57 is fixed to a nut member 51n in screw engagement with the screw shaft 51s. A drive pin 58 which projects forward is fixed to the pin support plate 57. The servomotor 3p is equipped with a rotary encoder 15p for detecting the rotational position of the servomotor 3p.

Moreover, as shown in FIG. 5, an ejector pin unit 61 is accommodated within an internal space 36i of a movable mold 36. The ejector pin unit 61 includes a pair of ejector pins 2p and 2q fixed to a base 60. The ejector pin unit 61 is movable over a predetermined stroke in the advancement/retraction direction of the movable platen 2m. The ejector pins 2p and 2q have tip ends facing a mold cavity 62 and are urged by means of return springs 63 and 64 in the direction opposite to the ejection direction. Symbol 65 denotes a through hole for the drive pin 58, and symbol W denotes a molding product.

The mold clamping apparatus U1 having the above-described molding product ejection apparatus E1 has a safety apparatus E2. The safety apparatus E2 is equipped with a motor control apparatus 70 shown in FIG. 3. The motor control apparatus 70 has a control function section for stopping the servomotors 3p and 3c in response to an open signal So output from a limit switch 71, which detects that a safety door D is opened.

When the motor control apparatus 70 receives an open signal So indicating the opened state of the safety door D, the motor control apparatus 70 turns off the servo-on circuit (see symbol 17 in FIG. 1) built into the motor control apparatus 70, or opens an on/off switch (see symbol 12 in FIG. 1) disposed in the power line for the servomotors 3p and 3c, in order to stop the supply of electricity to the servomotors 3p and 3c.

The above-described conventional motor control apparatus 70 has the following drawbacks.

First, when the return springs 63 and 64 are provided as in the molding product ejection apparatus E1, the ejector pins 2p and 2q are pushed out against the urging force of the return springs 63 and 64. Therefore, even when the servo control for the servomotor 3p is turned off, or the power supply for the servomotor 3p is stopped, the shaft of the servomotor 3p rotates due to the urging force of the return spring 63 and 64, with the result that the ejector pins 2p and 2q are pushed back to the initial position. Therefore, the above-described operation is insufficient in terms of securing safety through a quick stop of movement.

Second, for adjusting work or monitoring work, it is necessary to stop the ejector pins 2p and 2q at a desired position and to perform adjustment and confirmation of the state at that position. However, since the ejector pins 2p and 2q and other members return to their initial positions whenever the safety door D is opened, the adjustment work and the monitoring work cannot be performed properly, resulting in increased difficulty of work and operation.

SUMMARY OF THE INVENTION

An object of the present invention is to provide a motor control apparatus for an injection molding machine, which apparatus can quickly stop at a predetermined position a movable member such as ejector pins or a movable platen that is moving, thereby securing sufficient safety.

Another object of the present invention is to provide a motor control apparatus for an injection molding machine, which apparatus can stop a movable member at a desired position, thereby enhancing easiness of work (easiness of operation) in adjusting work or monitoring work.

In order to achieve the object, the present invention provides a motor control apparatus for an injection molding machine which has a control function section for stopping a drive motor in order to stop a movable member upon reception of an open signal indicating that a safety door is opened, wherein the motor control apparatus further includes an additional control function section for performing position control for the drive motor, upon reception of said open signal, so as to stop the movable member at a predetermined position. Therefore, when the safety door is opened and thus the open signal is supplied to the additional control function section, the additional control function section performs position control for the drive motor such that the movable member stops at the predetermined position that is set in advance.

BRIEF DESCRIPTION OF THE DRAWINGS

FIGS. 2(a)–2(c) are timing charts showing states of operation of various portions of the motor control apparatus shown in FIG. 1;

FIG. 3 is a partially-sectioned plan view of a mold clamping apparatus of an injection molding machine to which the motor control apparatus shown in FIG. 1 can be applied;

DESCRIPTION OF THE PREFERRED EMBODIMENT

An embodiment of the present invention will now be described in detail with reference to the drawings. The accompanying drawings are illustrative of the embodiment and are not meant to limit the scope of the invention. To clarify the invention, the detailed description of known parts is omitted.

Figure 1:
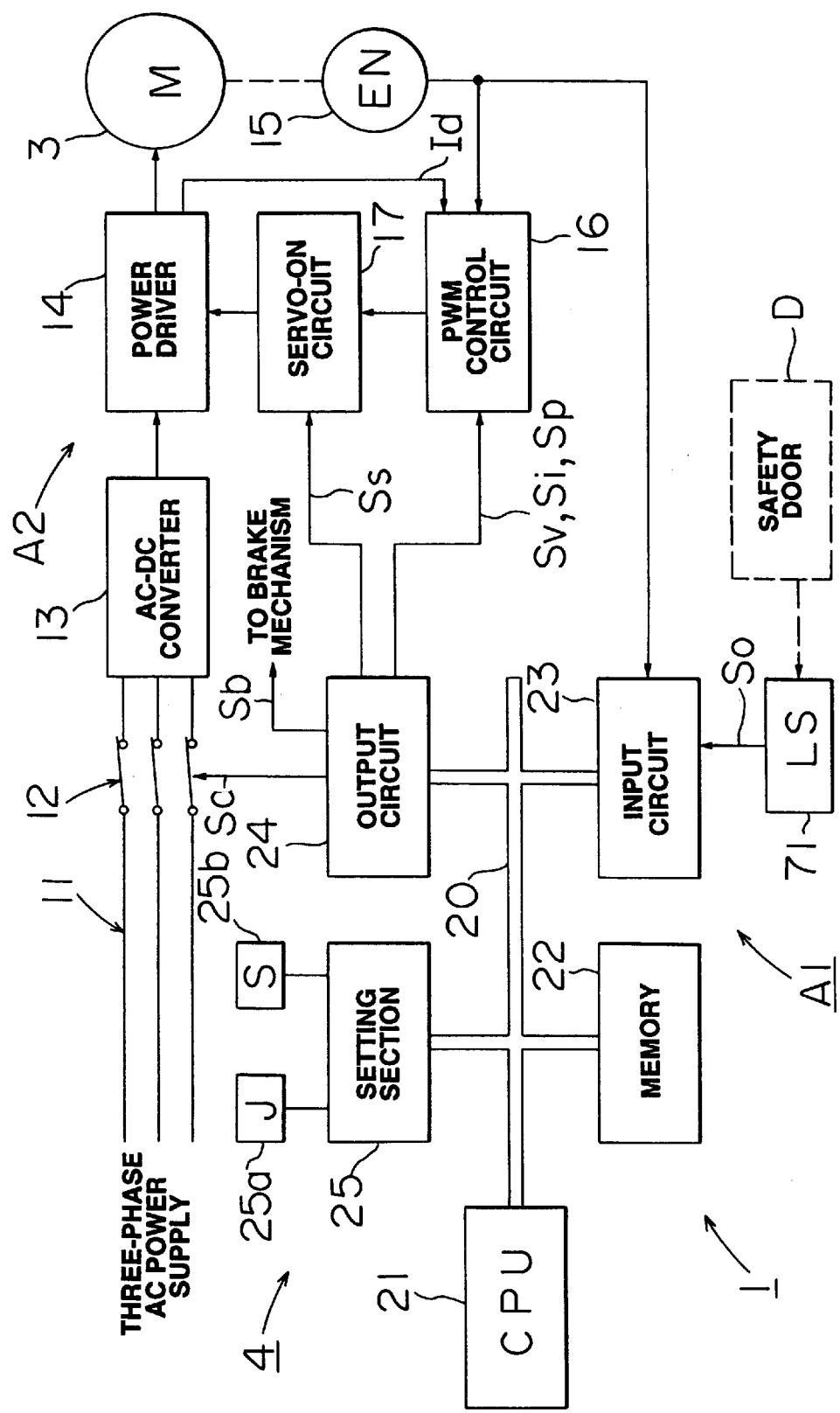
FIG. 1 is a circuit block diagram of a motor control apparatus according to an embodiment of the present invention.
Figure 4:
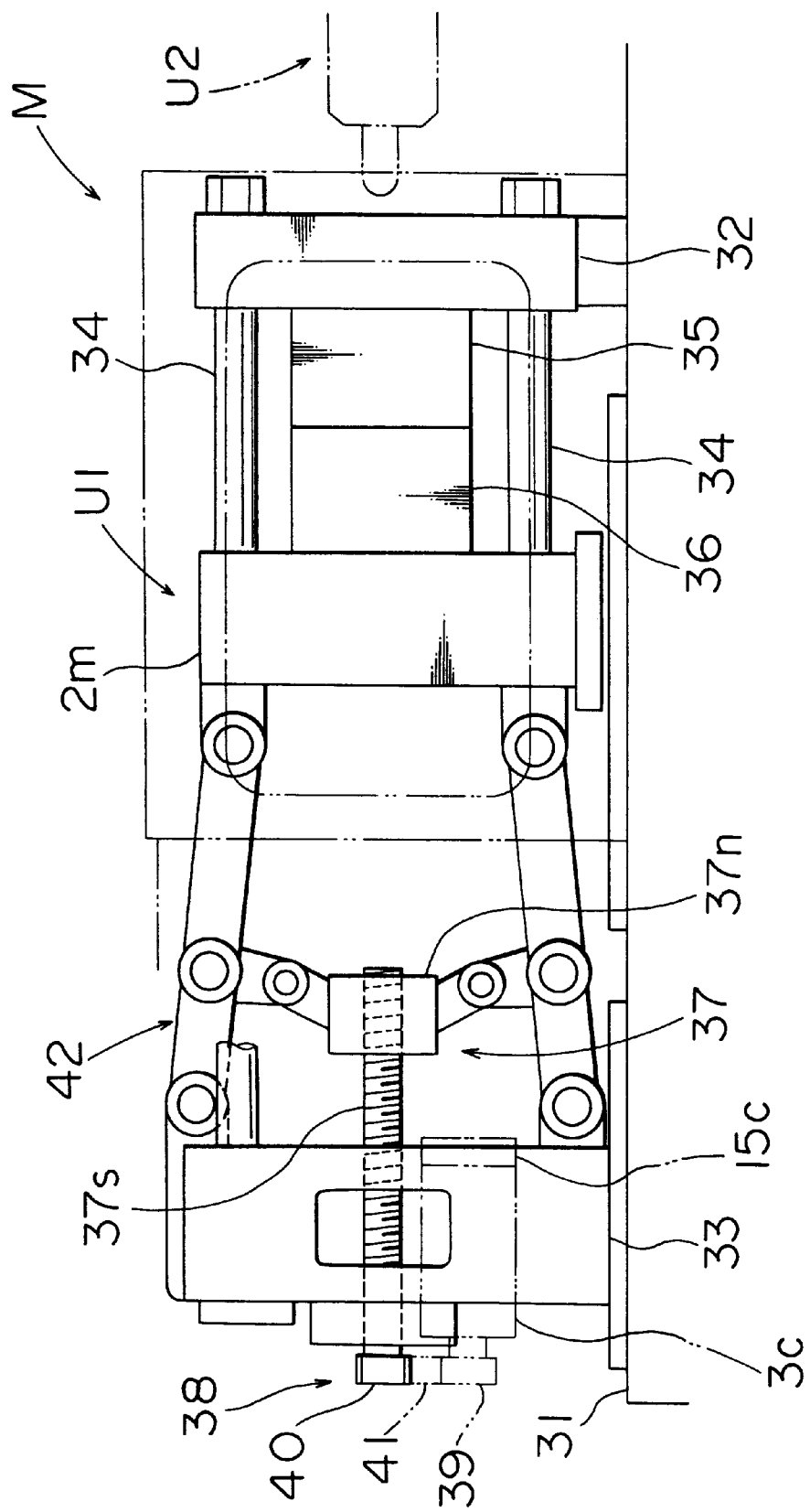
FIG. 4 is a side view of the mold clamping apparatus shown in FIG. 3.
Figure 5:
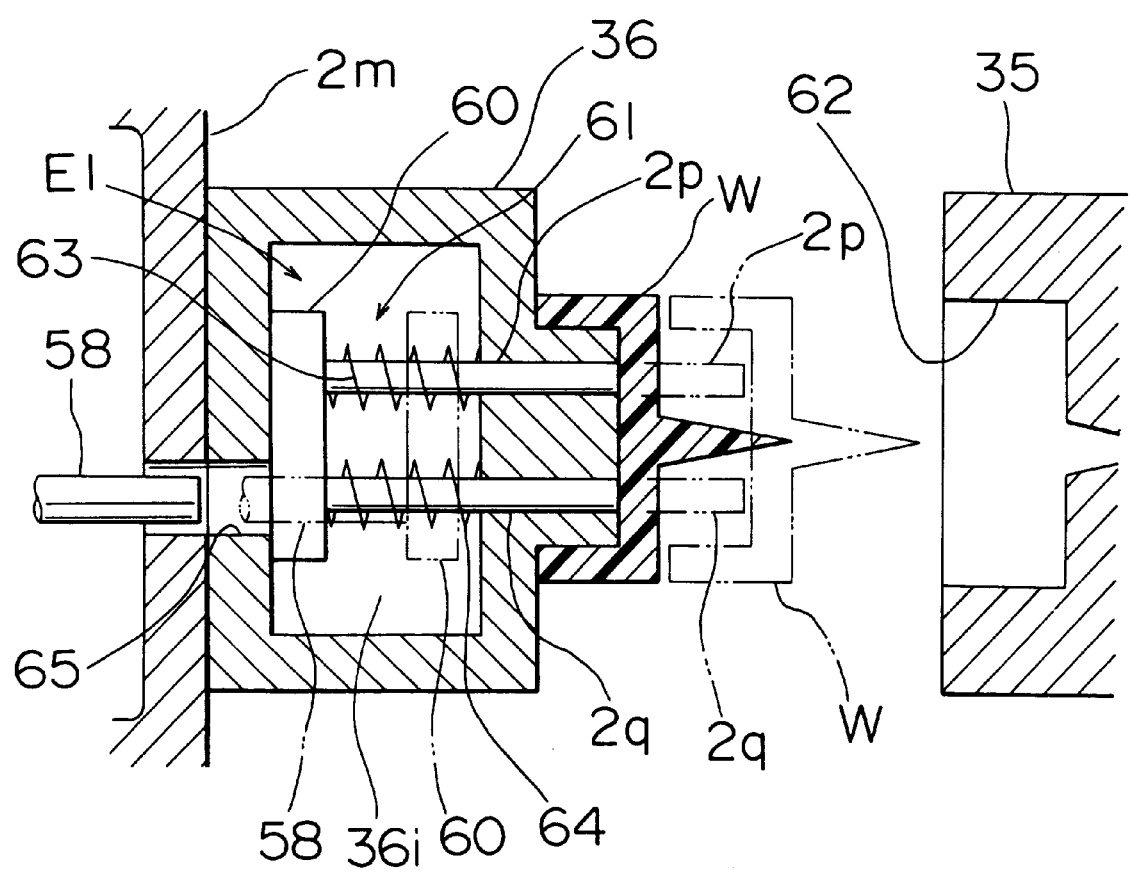
FIG. 5 is a sectioned plan view showing a part of an ejection apparatus provided in the mold clamping apparatus shown in FIG. 3.

First, with reference to FIG. 1, the structure of a motor control apparatus according to the present embodiment will be described.

Circuits and components of the motor control apparatus 1 are generally divided into a servomotor control system A2 for the servomotor (drive motor) 3 (3c, 3p) and a host control system A1 for controlling the servo control system A2.

The servo control system A2 includes a power driver 14. The output of the power driver 14 is connected to the servomotor 3, and the input of the power driver 14 is connected to the output of an AC-DC converter 13. The input of the AC-DC converter 13 is connected to a power line 11 of a three-phase AC power supply. Reference numeral 16 denotes a PWM (pulse-width modulation) control circuit, which receives from an encoder 15 (15c, 15p) provided for the servomotor 3 a signal indicating the rotational position of the servomotor 3, and from the power driver 14 a signal indicating the magnitude of current Id supplied to the servomotor 3. The output of the PWM control circuit 16 is connected to the power driver 14 via a servo-on circuit 17.

The host control system A1 includes a control function section 4 which relates to the present invention. The host control system A1 includes a CPU (central processing unit) 21, a memory 22, an input circuit 23, an output circuit 24, and a setting section 25, which are connected to a bus line 20, and constitutes a computer function section for performing various kinds of control and processing in accordance with a predetermined control program. A limit switch 71 for detecting opened/closed states of the safety door D is connected to the input circuit 23. Further, the input circuit 23 receives from the encoder 15 a signal that represents the rotational position of the servomotor 3.

Meanwhile, an on/off switch 12, the servo-on circuit 17 and the PWM control circuit 16 are connected to the output circuit 24. Thus, the output circuit 24 supplies the on/off switch 12 with an open/close control signal Sc for opening/closing the on/off switch 12, and also supplies the servo-on circuit 17 with a servo-on circuit control signal Ss for turning on and off the servo-on circuit 17. Further, the output circuit 24 supplies the PWM control circuit 16 with a velocity command signal Sv, a current command signal Si, and a position command signal Sp.

The setting section 25 has a function for setting predetermined positions Xa and Xb at which a movable member 2 such as the ejector pins 2p, 2q or the movable platen 2m is stopped upon reception of the open signal So indicating that the safe door D is opened. In the present embodiment, the predetermined position Xa represents a position of the movable member 2 at a point in time when the safety door D is opened, while the predetermined position Xb represents an arbitrary position that can be set in advance. A mode can be selected between a first mode for stopping the movable member 2 at the predetermined position Xa and a second mode for stopping the movable member 2 at the predetermined position Xb. In FIG. 1, symbol 25a denotes a selection key for selecting the first mode, and symbol 25b denotes a selection key for selecting the second mode. Although not illustrated in FIG. 1, there is further provided a selection key for turning off the servo-on circuit 17 or opening the on/off switch 12 interposed in the power line of the servomotor 3, as in the conventional manner, without selecting the above-described first or second mode for stopping the movable member 2 at the predetermined position Xa or Xb.

Next, a description will be given of the operation of the motor control apparatus 1 according to the present embodiment with reference to FIG. 1 and FIGS. 2(a)–2(c).

An ordinary molding operation is performed in a state in which the safety door D is closed. Therefore, while the servomotor 3 operates, its rotational position is detected by the rotary encoder 15, based on which the PWM control circuit 16 modulates the pulse width of the control signal that is supplied to the power driver 14 via the servo-on circuit 17. Thus, servo control is performed such that the rotational position of the servomotor 3 coincides with a command value. During this operation, the velocity command signal Sv, the current command signal Si, and the position command signal Sp are supplied from the output circuit 24 to the PWM control circuit 16. Thus, velocity control, current control, and position control are performed in accordance with the respective command signals. For example, in the case of the molding product ejection apparatus E1, as shown in FIG. 2(c), the position of the ejector pins 2p and 2q varies as illustrated by a line X. That is, the ejector pins 2p and 2q advance from the initial position Xo, and when the ejector pins 2p and 2q reach an advanced position Xe, they retract to return to the initial position Xo.

Now, there is assumed a case where the safety door D is opened while the servomotor 3 is operating (FIG. 2(a)). This state is detected by means of the limit switch 71, and an open signal So is supplied to the control function section 4. Upon reception of this signal, the control function section 4 performs position control for the servomotor 3 such that the movable member 2 stops at the predetermined position Xa or Xb selected by the setting section 25. For example, in the case where the predetermined position Xa is selected for the molding product ejection apparatus E1, when the state of the limit switch 71 changes from OFF to ON and then the open signal So is output, as shown in FIG. 2(b), position control is performed for the servomotor 3 such that the ejector pins 2p and 2q stop at the position indicated by the rotary encoder 15 at that point in time. Through this operation, the ejector pins 2p and 2q immediately stop at the position Xa shown in FIG. 2(c). When the second mode is selected, the ejector pins 2p and 2q stop after quick movement to the position Xb shown in FIG. 2(c).

When the ejector pins 2p and 2q have stopped at the position Xa or Xb, an operation for braking the servomotor 3 is performed. For example, a brake-on signal Sb is supplied to an unillustrated brake mechanism in order to mechanically lock the shaft of the servomotor 3. This braking operation is preferable, because the servomotor 3 can be stopped reliably and quickly. In this case, simultaneously with the braking operation, the servo-on circuit 17 is turned off or the on/off switch 12 is opened.

Since the movable member 2 such as the movable platen 2m or the ejector pins 2p, 2q can be stopped quickly at the position (predetermined position Xa) where the movable member 2 is located when the safety door D is opened, there can be solved the drawback that the return springs push the movable member 2 such as the movable platen 2m or the ejector pins 2p and 2q back to the initial position. Thus, a sufficient degree of safety can be secured. Further, the movable member 2 such as the movable platen 2m or the ejector pins 2p, 2q can be stopped at a desired position (predetermined position Xb). Therefore, easiness of work (easiness of operation) in adjusting work or monitoring work can be enhanced.

The present invention is not limited to the above-described embodiment. Regarding structural details, approaches, and the like, modifications and any omission or addition may be possible as needed without departing from the scope of the invention.

For example, although the drive motor used in the above-described embodiment is of a servomotor type, the present invention can be applied to the case where other various types of drive motors other than servomotors are used. Further, although the ejection pins and the movable platen are mentioned as examples of the movable member, the present invention can be applied to other movable members of the injection machine, such as a screw shaft. In the case where the movable member is the screw shaft, a purge cover of the injection machine serves as the safety door.

What is claimed is:

1. A motor control apparatus for an injection molding machine which has a control function section for stopping a drive motor in order to stop a movable member upon reception of an open signal indicting that a safety door is opened, said motor control apparatus further comprising:

an additional control function section for performing position control for said drive motor, upon reception of said open signal, so as to stop said movable member at a predetermined position.

2. The motor control apparatus according to claim 1, wherein said drive motor is a servomotor.

3. The motor control apparatus according to claim 1, wherein said movable member is an ejector pin which is provided in a molding product ejection apparatus and is urged by a return spring.

4. The motor control apparatus according to claim 1, wherein said movable member is a movable platen of a mold clamping apparatus.

5. The motor control apparatus according to claim 1, wherein said predetermined position is a position of said movable member at a point in time when said safety door is opened.

6. The motor control apparatus according to claim 1, wherein said predetermined position is an arbitrary position set in advance.

7. The motor control apparatus according to claim 1, wherein said additional control function section performs a braking operation for said drive motor when said movable member has been stopped at said predetermined position.

* * * * *